United States Patent [19]

Weir et al.

[11] Patent Number: 4,571,264
[45] Date of Patent: Feb. 18, 1986

[54] RECOVERY OF GOLD FROM REFRACTORY AURIFEROUS IRON-CONTAINING SULPHIDIC ORE

[75] Inventors: Donald R. Weir, Fort Saskatchewan; Roman M. Genik-Sas-Berezowsky, Edmonton, both of Canada

[73] Assignee: Sherritt Gordon Mines Limited, Toronto, Canada

[21] Appl. No.: 707,923

[22] Filed: Mar. 4, 1985

[30] Foreign Application Priority Data

Sep. 27, 1984 [CA] Canada .................................. 464178

[51] Int. Cl.⁴ ............................................. C22B 11/04
[52] U.S. Cl. .................... 75/101 R; 75/108; 75/115; 75/118 R; 423/27; 423/36; 423/41; 423/42; 423/45; 423/87; 423/146; 423/150; 423/158
[58] Field of Search .................... 75/101 R, 108, 115, 75/118 R; 423/27, 36, 41, 42, 45, 87, 146, 150, 158

[56] References Cited

U.S. PATENT DOCUMENTS

| 4,038,362 | 7/1977 | Guay | 423/29 |
| 4,266,972 | 5/1981 | Redondo-Abad et al. | 423/41 |
| 4,304,644 | 12/1981 | Victorovich et al. | 423/150 |

Primary Examiner—John Doll
Assistant Examiner—Robert L. Stoll
Attorney, Agent, or Firm—Robert F. Delbridge; Arne I. Fors

[57] ABSTRACT

A process for recovering gold from refractory auriferous iron-containing sulphidic ore which comprises feeding ground ore as an aqueous slurry to an acidic pretreatment step. The ground ore in the acidic pretreatment step is treated with aqueous sulphuric acid solution to decompose carbonate and acid consuming gangue compounds, and subjecting the treated slurry to a first liquid-solids separation step to produce a sulphate solution and separated solids. Water is added to the separated solids in a first repulping step to form a slurry having a pulp density in the range of from about 25 to about 60% by weight solids. The first repulped slurry is oxidized in a pressure oxidation step at a temperature in the range of from about 135° to about 250° C. under a pressurized oxidizing atmosphere while maintaining a free acid concentration of from about 5 to 40 g/L sulphuric acid to cause dissolution of iron, formation of sulphuric acid and oxidation of substantially all oxidizable sulphide compounds to sulphate form with less than about 20% of oxidized sulphur being present as elemental sulphur during the oxidation step. Water is added to the oxidized slurry in a seocnd repulping step to produce a repulped oxidized slurry with a pulp density in the range of from about 5 to 15% by weight, and subjecting the repulped oxidized slurry to a second liquid-solids separation step to produce an acid and iron containing solution and oxidized separated solids. The acid and iron containing solution is recycled to at least one of the first and second repulping steps.

11 Claims, 1 Drawing Figure

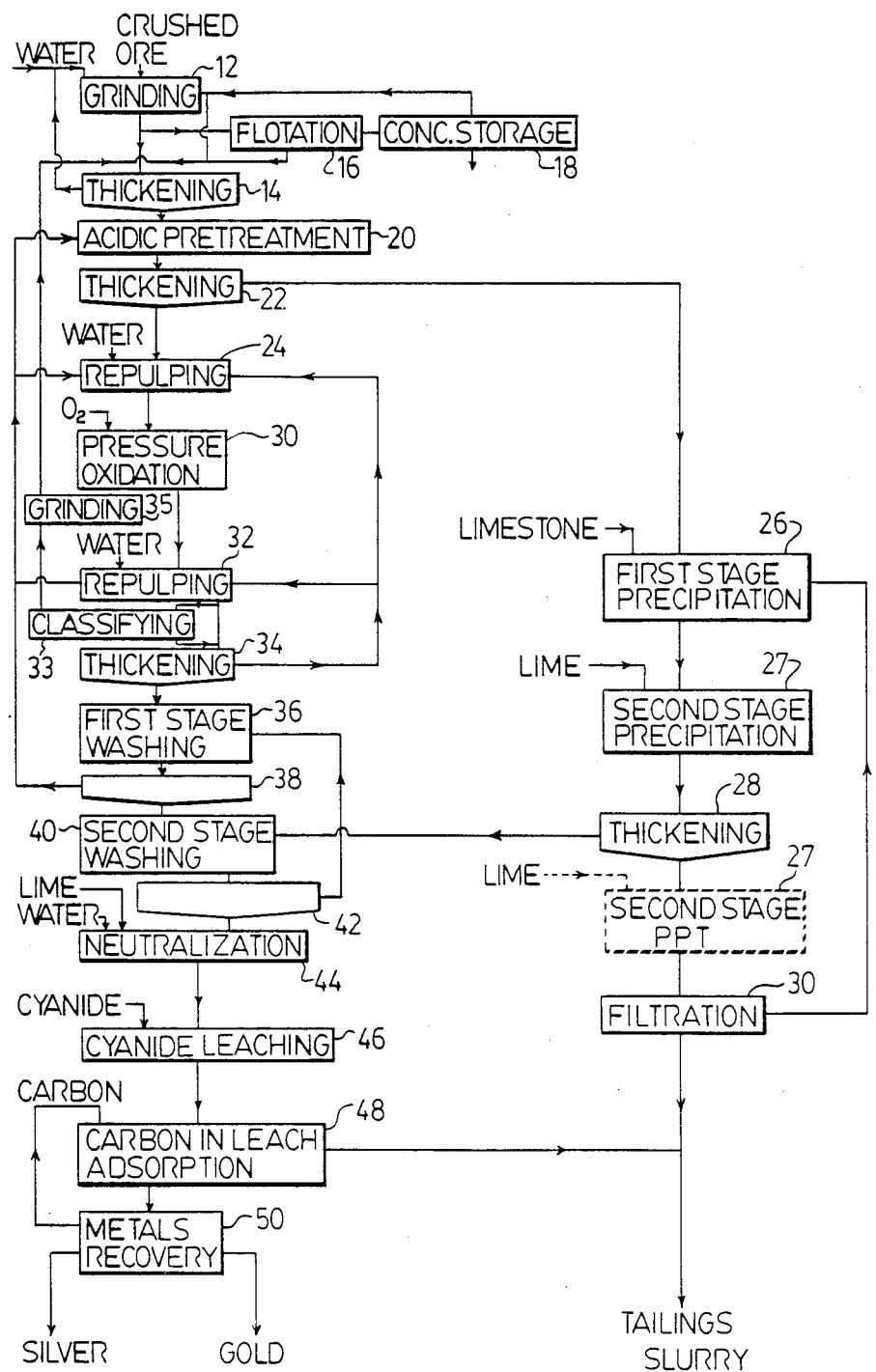

RECOVERY OF GOLD FROM AURIFEROUS REFRACTORY IRON-CONTAINING SULPHIDIC ORE

This invention relates to the recovery of gold and possibly other metal values from refractory auriferous sulphidic ores.

It is known that gold recovery from such ore by conventional processes such as cyanidation is not satisfactory, and various preliminary treatment processes have been proposed. However, for various reasons, the preliminary treatments proposed in the prior art do not improve gold recovery from such ore as much as is desirable in a commercial operation.

It is therefore an object of the present invention to provide an improved preliminary treatment process for such ores which includes pressure oxidation treatment.

The present invention provides a process for recovering gold from refractory auriferous iron-containing sulphidic ore comprising feeding ground ore as an aqueous slurry to an acidic pretreatment step, treating the ground ore in the acidic pretreatment step with aqueous sulphuric acid solution to decompose carbonate and acid consuming gangue compounds which might otherwise inhibit a subsequent pressure oxidation step, subjecting the treated slurry to a first liquid-solids separation step to produce a sulphate solution and separated solids, adding water to the separated solids in a first repulping step to form a slurry having a pulp density in the range of from about 25 to about 60% by weight solids, oxidizing the first repulped slurry in a pressure oxidation step at a temperature in the range of from about 135° to about 250° C. preferably from about 165° to about 190° C., under a pressurized oxidizing atmosphere while maintaining free acid concentration of from about 5 to about 40 g/L sulphuric acid, preferably from about 5 to about 15 g/L to cause dissolution of iron, formation of sulphuric acid and oxidation of substantially all oxidizable sulphide compounds to sulphate form with less than about 20% of oxidized sulphur, preferably less than about 10%, being present as elemental sulphur during the oxidation step, adding water to the oxidized slurry in a second repulping step to produce a repulped oxidized slurry with a pulp density in the range of from about 5 to about 15% by weight solids, subjecting the repulped oxidized slurry to a second liquid-solids separation step to produce an acid and iron containing solution and oxidized separated solids, recycling the acid and iron containing solution to at least one of the first and second repulping steps, washing the oxidized separated solids with an aqueous wash solution in a washing step, separating the washed solids from used washed solution containing acid and dissolved iron and non-ferrous metal sulphates in a third liquid-solids separation step, recycling the used washed solution containing acid and dissolved iron and non-ferrous metal sulphates to the acidic pretreatment step, and recovering gold from the washed solids.

Advantageously, a sufficient amount of magnesium ions is maintained in the slurry in the pressure oxidation step to produce a Mg:Fe molar ratio in solution of at least about 0.5 to 1.0 to cause iron which is precipitated during the pressure oxidation step to tend to be precipitated as hematite rather than as other less insoluble and hence more metallic iron compounds, i.e. potential lime consuming compounds.

The process may also include subjecting at least some slurry from at least one of said second repulping step and said washing step to a classification step to separate solids above a predetermined size from the remaining slurry, grinding the separated oversized solids to a smaller size, feeding the ground solids with ground ore to the acidic pretreatment step, and returning the remaining slurry to the step following said at least one of said second repulping step and said washing step.

The acid and iron containing solution from the second liquid-solids separation step may be recycled partly to the first repulping step and partly to the second repulping step.

The process may also include adding a precipitation agent in a precipitation step to the sulphate solution from the first separation step to precipitate metals as their respective hydroxides or hydrated oxides, sulphate ions as insoluble sulphates and arsenic as insoluble arsenates, separating the precipitates from the remaining aqueous solution, and utilizing at least some of the separated aqueous solution as aqueous wash solution in said washing of the oxidized separated solids.

Embodiments of the invention will now be described, by way of example, with reference to the accompanying drawing which shows a flowsheet of a process for the recovery of gold and other metal values from refractory auriferous sulphidic ore.

Referring to the drawing, refractory auriferous sulphidic ore which is treated in this embodiment contains from about 2 to about 30 g/t Au, from about 0.5 to about 85 g/t Ag, and by weight from about 1.5 to about 20% Fe, from about 25 to about 85% $SiO_2$, from about 0.5 to about 8% S, from about 0.01 to about 3.5% As, from about <0.01 to about 5.0% Sb, from about 0.5 to about 10% Al, from about 0.1 to about 5% Ca, from about 0.1 to about 10% $CO_2$, from about <0.1 to about 10% Mg and from about <0.1 to about 1.5% C (organic).

The sulphidic content of such ore may comprise one or more of the following materials, namely pyrite, arsenopyrite, pyrrhotite, stibnite and sulphosalts, and the ore may also contain varying amounts of lead, zinc and copper sulphides. Also, some ore may contain oxidizable carbonaceous species.

After initial crushing, the ore is ground in grinding step 12 to 70% minus 325 mesh Tyler screen (less than 44 microns) in a suitable manner, such as by a semiautogenous grinding mill followed by a ball mill. The ground ore is then thickened in a thickening step 14, such that the underflow slurry has a pulp density in the range of from about 40 to about 60% solids. Overflow solution from the thickening step 14 is returned to the grinding step 12, to which additional water may be supplied if necessary.

In the pressure oxidation step to be described later, the oxidation of various sulphur compounds such as pyrite and arsenopyrite, antimonial compounds and carbonaceous compounds releases considerable heat. In order to enable the feed solids to the oxidation step to contain optimum oxidizable species to provide autogenous oxidation, an optional flotation step 16 may be provided between the grinding step 12 and thickening step 14. As previously mentioned, the provision of this feature is based on the realization that, in the pressure oxidation pretreatment of refractory auriferous sulphidic ores, the sulphidic sulphur content of the ore is an important feature, especially pyrite and arsenopyrite, the major exothermic reaction during the pressure oxidation involving the total oxidation of the sulphidic sulphur to the sulphate form. Although the oxidation of carbonaceous species and antimonial compounds is also important, the nature and the reactivity of the carbonaceous species is difficult to define. It has consequently been discovered that the oxidation of the sulphur can be considered to be the major source of the heat.

For example, the sulphidic sulphur content of the crushed ore may vary at different times from about 1% to about 4% by weight, whereas the preferred sulphidic sulphur content for the pressure oxidation step is about 3%. Thus, if the sulphidic sulphur content is substantially greater than 3%, the ground ore may be fed to a flotation step 16, which may be in the form of a rougher flotation circuit, and the resultant sulphidic flotation concentrate of high sulphur content may be stored in a concentrate storage 18, with the flotation tailings of desired sulphur content being passed to the thickening step 14. If the sulphidic sulphur content is substantially less than 3%, concentrate of high sulphidic content from concentrate storage 18 can be passed as a slurry to the thickening step 14 together with the ground ore of low sulphidic content from grinding step 12. Alternatively, the concentrate of high sulphidic content from concentrate storage 18 could be fed to the grinding step 12 together with the crushed ore of low sulphur content.

The underflow slurry of desired sulphidic sulphur content from the thickening step 14 proceeds to an acidic pretreatment step 20 where the slurry is repulped with acidic wash solution obtained by washing solids from the pressure oxidation step which will be described later. Such acidic wash solution will generally contain iron, aluminum, magnesium and arsenic and other non-ferrous metal values dissolved in the pressure oxidation step to be described as well as sulphuric acid. The acidic pretreatment decomposes carbonates and acid consuming gangue components which might otherwise inhibit the pressure oxidation step. The acidic pretreatment step 20 thus also reduces acid consumption in the subsequent pressure oxidation step and lime consumption in a neutralization step 44 which will be described later. It will also be noted that the pretreatment step 20 utilizes acid produced in the subsequent pressure oxidation step 30.

The resultant slurry is then thickened in a thickening step 22, and the underflow slurry is mixed in a repulping step 24 with overflow solution from a pressure oxidation slurry thickening step which will be described later. This recycle can serve to maintain the magnesium content of the liquid at a desired level for a purpose which will be described later, as well as to recycle ferric iron and acid, preheat the slurry and adjust its pulp density, the preferred pulp density being about 42%.

The overflow solution from the thickening step 22 is passed to a first stage precipitation step 26 where limestone is added to raise the pH to about 5 and precipitate metal values such as ferric iron, aluminum and arsenate as well as removing sulphate sulphur as gypsum. The slurry then passes to a second stage precipitation step 27 where lime is added to raise the pH to about 10 to precipitate magnesium and other metal values. The resultant slurry is thickened in a thickening step 28 from which the overflow water is sufficiently pure for use in a pressure oxidation residue washing step which will,be described later, such overflow water also being sufficiently pure for waste disposal. The thickener underflow is filtered in a filtration step 30, with separated water being returned to the first stage precipitation step 26 and the solids being disposed of as tailings.

The repulped slurry from repulping step 24 then proceeds to pressure oxidation step 30 where the slurry is treated in one or more multicompartment autoclaves at a temperature of from about 160° to about 200° C. and into which oxygen is sparged to maintain a total pressure of from about 700 to about 5000 kPa, with acidity of 5 to 25 g/L $H_2SO_4$ to oxidize the sulphur, arsenic and antimony minerals. It is especially important to oxidize the sulphides to an oxidation stage higher than free sulphur, since the presence of free sulphur is detrimental to gold recovery. In such oxidation, iron is the effective oxygen transfer agent. It is therefore necessary that adequate iron be present in solution, particularly in the initial compartments of the autoclave, this being achieved by ensuring a sufficiently high steady acidity.

Additionally, the autoclave acidity and temperature are controlled such that the desired liberation of gold is achieved by oxidation of the sulphides, arsenides and antimonial compounds to a higher oxidation stage, and at the same time the physical characteristics of the solids produced are such that subsequent thickening and washing is facilitated. Although the acidity and temperature can usually be controlled in the desired manner, it may sometimes be necessary (depending upon the composition of the ore) to add acid or water in the repulping step 24 and/or to provide additional cooling or heating.

When necessary, for example if the sulphut content of the ore is less than about 5% by weight, heat from the oxidized slurry from pressure oxidation step 30 may be used to heat the incoming slurry from repulping step 24. For example, the oxidized slurry will usually be flash discharged from the autoclave and the resultant steam used to heat the incoming slurry. Also, where possible, the pulp density of the slurry in the autoclave may be controlled such that the heat generated by oxidation of the sulphur content provides the desired operating temperature.

According to a further feature of the invention, it has been found that it is desirable (for reducing lime requirements in a neutralization step 44 prior to cyanidatiion) that dissolved iron which becomes hydrolyzed and precipitated in pressure oxidation step 30 be precipitated as hematite rather than as basic ferric sulphate or hydronium jarosite, and further that such hematite precipitation can be promoted by maintaining a sufficiently high concentration of magnesium in the pressure oxidation step.

The pressure oxidation of pyrite results in the generation of ferric sulphate and sulphuric acid. Some of the ferric sulphate is hydrolyzed and may be precipitated as hematite, ferric arsenate, hydronium jarosite, basic ferric sulphate or a mixture of these compounds. The nature of the precipitated iron species depends on such parameters as temperature, total sulphate levels, acidity, pulp density, grade of ore and the nature and quantity of acid consuming gangue. The pressure oxidation of high grade pyrite and/or arsenopyrite feeds at high solids contents in the pulp generally favours precipitation of the iron as basic ferric sulphate, hydronium jarosite or ferric arsenate.

With the process of the present invention, it has been found that hematite is the preferred form of iron precipitate in the pressure oxidation step 30, in that it results in a better release of acid in the pressure oxidation step 30 which is readily removed by limestone in the first stage precipitation step 26, thus reducing lime requirements in the cyanidation circuit. Also, the precipitation of iron as basic ferric sulphate and/or a hydronium jarosite is undesirable for two reasons. Firstly, a greater portion of labile sulphate (which is a potential lime consumer) enters the neutralization step 44 resulting in a higher consumption of lime. Secondly, the reaction of lime with basic ferric sulphate and jarosites, with conversion of the iron precipitate to insoluble iron hydroxides and gypsum, results in the generation of slimy precipitates, increases the solids content and results in an increased loss of gold and silver to the slimes by adsorption.

Thus, it had been found that there should be a sufficient amount of magnesium in the pressure oxidation step 30 to produce an Mg:Fe molar ratio in solution of at least about 0.5:1.0 and preferably at least about 1:1. Many auriferous pyrite ores contain appreciable levels of acid soluble magnesium which may meet at least part of such magnesium requirements. In many instances however, the gold and sulphidic content of the ore is upgraded by flotation prior to oxidation, thereby reducing the magnesium content of the feed to the oxidation step 30. The magnesium requirements of the pressure oxidation step 30 may be provided at least in part by the recycle of the acidic pressure oxidation leach solution from the thickening step 34 to the repulping step 24 and/or by supplying magnesium-containing make-up water to the repulping step 24. If desired, the second stage precipitation step 27 may be heated after the thickening step 28 (as indicated in dotted outline in the drawing) so that the thickener overflow supplied to the pressure oxidation residue washing step to be described contains magnesium ions for the above mentioned purpose.

After a suitable retention time in the pressure oxidation autoclave, for example about 1.5 hours, the oxidized slurry is flashed into a repulping step 32 where the oxidized slurry is repulped with overflow from a subsequent thickening step 34 to dilute the slurry to less than 10% solids so as to obtain efficient use of flocculant which is added in repulping step 32. This also reduces flocculant problems in the thickening step 34. The acid and iron-containing overflow from the thickening step 34 is thus recycled partly to the repulping step 32 and partly to the repulping step 24 previously mentioned.

The underflow from the thickening step 34 is washed at a wash ratio of about 4:1 by two-stage countercurrent decantation in washing steps 36, 40. In the first washing step 36, the underflow solids from the thickening step 34 are washed with overflow solution from a thickener 42 subsequent to the second washing step 40. The acidic solution from the first washing step 36 is separated from the solids in a thickening step 38 and is recycled to the acidic pretreatment step 20 as previously mentioned, with a portion also being recycled to one or both repulping steps 24, 32 if desired.

In the second washing step 40, the underflow solids from the thickener 38 are washed with water from the thickening step 28, i.e. relatively pure water obtained after precipitation of metal values and sulphate from the overflow solution from the thickening step 22 (and which may contain magnesium ions as previously described). The slurry from the second washing step 40 passes to a thickening step 42, and overflow solution from the thickening step 42 is recycled to the first washing step 36 as previously mentioned, with the underflow solids from the thickening step 42 being passed to neutralizing step 44.

If desired, a portion of the repulped slurry from the repulping step 32 may be passed through a classifier 33 (such as a cyclone) before passing to the thickener 34. The classifier 33 grinds a predetermined oversize material which is reground in grinding step 35 and recycled to thickener 14. Such a feature enables gold to be recovered which might otherwise have been lost in the relative oversize material before treatment had yet been satisfactorily completed in the pressure oxidation step 30.

In neutralizing step 44, lime is added to neutralize the acidity of the solids and raise the pH to an extent suitable for cyanidation, namely to about 10 to 12, preferably about 10.5. Water, such as tailing pond water, may also be added to achieve the desired pulp density for cyanidation, namely from about 40 to about 45% solids by weight.

The neutralized slurry then proceeds to a two-stage cyanidation step 46, with cyanide solution being added to the first stage. The partly leached pulp (60-95% leached) cascades into an eight-stage carbon-in-leach adsorption section 48 to complete the leaching and recover dissolved gold and silver. After the eighth stage, the barren slurry is repulped with filter cake from the filtration step 30 and then disposed of as tailings. The loaded carbon passes to a metals recovery step 50 where the loaded carbon is stripped under pressure with caustic cyanide solution, and gold and silver are subsequently recovered by electrowinning or other suitable means from the eluate. Stripped carbon is regenerated in a kiln, screened and recycled to the carbon-in-leach adsorption step 48.

EXAMPLE

The feed material was a refractory auriferous gold ore, reground to 95% passing 88 $\mu$m (180 mesh), and containing 7.2 g/L Au, 1.6% As, 3.6% $CO_2$, 9.2% Fe, 36% $SiO_2$ and 4.6% S. Gold extraction by conventional cyanidation was 68%.

The ore was processed in a continuous circuit which consisted of feed slurry pretreatment tank and thickener, a repulp tank for the pretreatment thickener underflow, an autoclave feed pumping system, a four-compartment autoclave having a static volume of 106, an autoclave discharge system, an oxidation thickener feed tank, an oxidation thickener, and a countercurrent decantation wash circuit comprising two thickeners and their respective feed tanks. The continuous circuit also contained a gold recovery section comprising a pH adjustment tank, six stages of cyanidation leaching and six stages of carbon in pulp for gold adsorption and subsequent recovery. Waste acidic solution from the pretreatment thickener was treated with limestone and lime in a precipitation circuit, to precipitate arsenic, metals and associated sulphate as arsenates, metal hydroxides, hydrated oxides and gypsum, and subjected to a liquid-solids separation stage for recycle to metals depleted solution to the wash circuit.

The ore, as a 55% slurry of solids in water, was pretreated and diluted with acidic wash thickener overflow solution in the pretreatment tank. The acid reacted with the gangue components in the ore, releasing a portion of the carbonate content of the ore. The treated slurry was then subjected to a liquid-solids separation in the thickener, with overflow solution proceeding to the precipitation circuit for removal of dissolved metals and sulphate, and use of the metals depleted solution in the wash circuit. The pretreatment thickener underflow slurry containing 53% solids by weight, was repulped with hot, acidic solution from the oxidation thickener, diluting it to 30% solids by weight. This step served to preheat the oxidation feed slurry, decompose the bulk of the remaining carbonates prior to autoclaving, dilute the solid content of the slurry to a level consistent with the autothermal requirements of the oxidation reaction, and provide acid and iron to enhance the oxidation reactions. This slurry was then fed into the first compartment of the autoclave. Oxygen was sparged into all compartments, and the oxidation was conducted at 185° C. at a working pressure of 1850 kPa. The nominal retention time of the solids in the autoclave was 100 minutes.

Samples were withdrawn from individual compartments of the autoclave to provide a measure of the oxidation of sulphur, and liberation of gold, as determined by cyanide amenability testing of the samples of oxidized solids. Representative autoclave solution composition, the extent of sulphur oxidation to the sulphate form, and gold extractability data obtained under these continuous pressure oxidation conditions are presented below.

| Compart-ment | Oxidation solutions | | | % Sulphur Oxidation | Cyanidation | |
|---|---|---|---|---|---|---|
| | Fe | g/L $Fe^{2+}$ | $H_2SO_4$ | | Residue g/t Au | Extraction % Au |
| 1 | 0.2 | 0.2 | 7.6 | 53 | 1.10 | 85 |
| 2 | 0.4 | 0.2 | 10.2 | 58 | 0.97 | 87 |
| 3 | 1.7 | 0.1 | 16.2 | 95 | <0.2 | >98 |
| 4 | 1.2 | 0.1 | 15.8 | 99 | <0.2 | >98 |

The oxidized slurry was discharged through a flash tank, into the oxidation thickener feed tank, where is was diluted to 10% solids with a portion of the oxidation thickener overflow solution, and fed to the oxidation thickener. The oxidation thickener overflow solution was recycled, in part to the autoclave feed slurry preparation step, and in part to the oxidation thickener feed tank. The oxidation thickener underflow was subjected to two stages of washing in the CCD circuit to remove the bulk of the acidic oxidation liquor for recycle to the ore pretreatment. The second wash thickener underflow, containing 50% solids, was processed through the cyanidation and the carbon in pulp circuit for recovery of the gold.

Other embodiments of examples of the invention will be readily apparent to a person skilled in the art, the scope of the invention being defined by the appended claims.

What we claim as new and desire to protect by Letters Patent of the United States is:

1. A process for recovering gold from refractory auriferous iron-containing sulphidic ore comprising:
   feeding ground ore as an aqueous slurry to an acidic pretreatment step,
   treating the ground ore in the acidic pretreatment step with aqueous sulphuric acid solution to decompose carbonate and acid consuming gangue compounds which might otherwise inhibit a subsequent pressure oxidation step,
   subjecting the treated slurry to a first liquid-solids separation step to produce a sulphate solution and separated solids,
   adding water to the separated solids in a first repulping step to form a slurry having a pulp density in the range of from about 25 to about 60% by weight solids,
   oxidizing the first repulped slurry in a pressure oxidation step at a temperature in the range of from about 135° to about 250° C. under a pressurized oxidizing atmosphere while maintaining a free acid concentration of from about 5 to about 40 g/L sulphuric acid to cause dissolution of iron, formation of sulphuric acid and oxidation of substantially all oxidizable sulphide compounds to sulphate form with less than about 20% of oxidized sulphur being present as elemental sulphur during the oxidation step,
   adding water to the oxidized slurry in a second repulping step to produce a repulped oxidized slurry with a pulp density in the range of from about 5 to about 15% by weight,
   subjecting the repulped oxidized slurry to a second liquid-solids separation step to produce an acid and iron containing solution and oxidized separated solids,
   recycling the acid and iron containing solution to at least one of the first and second repulping steps,
   washing the oxidized separated solids with an aqueous wash solution in a washing step,
   separating the washed solids from used washed solution containing acid and dissolved iron and non-ferrous metal sulphates in a third liquid-solids separation step,
   recycling used washed solution containing acid, dissolved iron and dissolved non-ferrous metal sulphates to the acidic pretreatment step, and
   recovering gold from the washed solids.

2. A process according to claim 1 including maintaining a sufficient amount of magnesium ions in the slurry in the pressure oxidation step to produce an Mg:Fe molar ratio in solution of from about 0.5:1 to about 10:1 to cause iron which is precipitated during the pressure oxidation step to tend to be precipitated as hematite rather than as other insoluble iron compounds.

3. A process according to claim 1 including subjecting at least some slurry from at least one of said second repulping step and said washing step to a classification step to separate solids above a predetermined size from the remaining slurry, grinding the separated oversized solids to a smaller size, feeding the ground solids with ground ore to the acidic pretreatment step, and returning the remaining slurry to the step following said at least one of said second repulping step and said washing step.

4. A process according to claim 1 including recycling the acid and iron containing solution from the second liquid-solids separation step partly to the first repulping step and partly to the second repulping step.

5. A process according to claim 1 including adding a precipitating agent in a precipitation step to the sulphate solution from the first separation step to precipitate metals as their regenerated hydroxides or hydrated oxides, sulphate ions as insoluble sulphate and arsenic as insoluble arsenate, separating the precipitates from the remaining aqueous solution, and utilizing at least some of the separated aqueous solution as aqueous wash solution in said washing of the oxidized separated solids.

6. A process according to claim 2 including adding a precipitating agent in a precipitation step to the sulphate solution from the first regeneration step to raise the pH to a value in the range of from about 5 to about 8.5 to precipitate desired dissolved values while causing magnesium ions to remain in solution, and utilizing at least some of the magnesium containing solution as aqueous wash solution in said washing of the oxidized separated solids to provide magnesium ions in the recycled used wash solution.

7. A process according to claim 1 wherein some of the used wash solution is recycled to at least one of the first and second repulping steps.

8. A process according to claim 1 wherein heat from the oxidizing step is utilized to heat the slurry fed thereto.

9. A process according to claim 1 wherein the pulp density of the slurry in the oxidizing step is controlled such that the heat generated by oxidation of the sulphur content produces the desired oxidizing temperature.

10. A process according to claim 1 wherein the first repulped slurry is oxidized at a temperature in the range of from about 165° to about 190° C.

11. A process according to claim 1 wherein the first repulped slurry is oxidized while maintaining a free acid concentration of from about 5 to about 15 g/L sulphuric acid.

* * * * *